United States Patent [19]

Petersen

[11] Patent Number: 4,597,686

[45] Date of Patent: Jul. 1, 1986

[54] QUICK RELEASE CONNECTING ASSEMBLY

[75] Inventor: H. Norman Petersen, Kenosha, Wis.

[73] Assignee: Outboard Marine Corporation, Waukegan, Ill.

[21] Appl. No.: 617,972

[22] Filed: Jun. 6, 1984

[51] Int. Cl.⁴ .............................................. F16B 1/04
[52] U.S. Cl. ..................... 403/11; 403/166; 403/316; 403/324; 403/289; 74/473 R; 440/86
[58] Field of Search ............... 74/473 R; 440/86; 403/373, 344, 166, 383, 71, 316, 324, 289, 379

[56] References Cited

U.S. PATENT DOCUMENTS

| 1,186,885 | 6/1916 | Cook | 403/324 |
|---|---|---|---|
| 1,409,023 | 3/1922 | Price | 403/344 X |
| 2,728,320 | 12/1955 | Kloss | 440/86 |
| 2,887,083 | 5/1959 | Conroy | 440/86 |
| 3,145,688 | 8/1964 | Kincannon | 440/86 |
| 3,867,050 | 2/1975 | Pitner | 403/373 |

Primary Examiner—Cornelius J. Husar
Assistant Examiner—Joseph A. Fischetti
Attorney, Agent, or Firm—Michael, Best & Friedrich

[57] ABSTRACT

A connecting assembly comprising a support including spaced-apart sides, and a bore extending between the sides, a first member slideable in the bore, and including a first portion located on one side of the support, and a second member including an opening therein. The connecting assembly also includes a connecting device adjacent to one side of the support for connecting the second member to the first portion of the first member and comprising a first piece fixedly connected to the first portion, and a second piece located between the first piece and the one side of the support. The second piece also includes a bore which receives the first member for movement thereof relative to the second piece between a connect position with the first piece adjacent the second piece and a disconnect position with the first piece spaced from the second piece. The connecting device also includes a pin which projects from one of the first piece and the second piece and which extends into the opening in the second member when the first member is in the connect position so that the second member is secured on the pin between the first piece and the second piece. The pin is withdrawn from the opening when the first member is in the disconnect position. The connecting assembly also includes a springhair pin for releasably securing the first member in the connect position.

13 Claims, 5 Drawing Figures

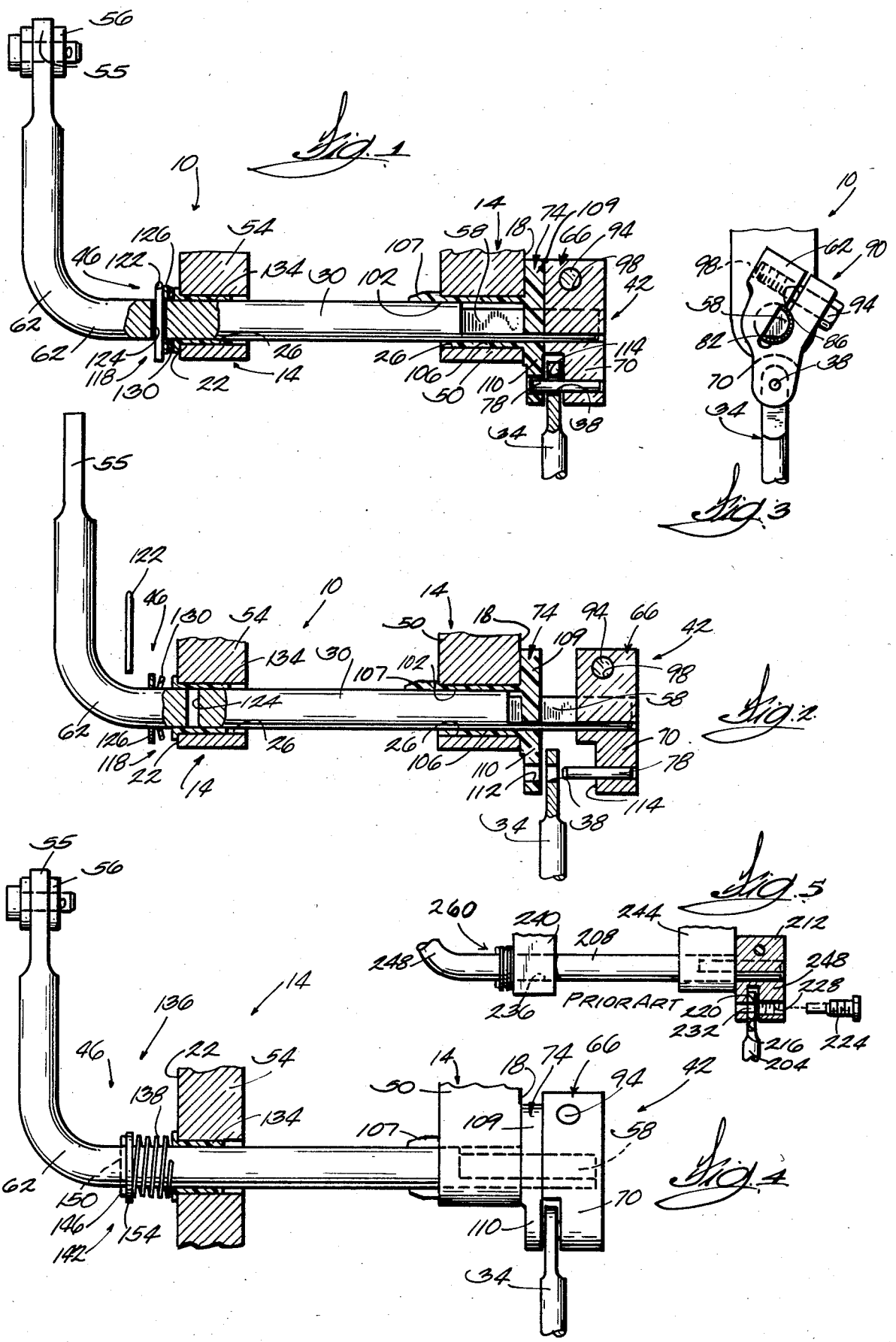

QUICK RELEASE CONNECTING ASSEMBLY

BACKGROUND OF THE INVENTION

This invention relates to connecting assemblies and, more particularly, to quick release connecting assemblies provided for connecting a second member at a right angle to a first member, and to such connecting assemblies which permit connection and disconnection by access to a point spaced from the point of connection.

Previous connecting assemblies providing for connection of a second member to a first member have required access to the point of connection in order to connect and disconnect the second member from the first member. In one such assembly 200, as illustrated in FIG. 5 of the drawings, a second member 204 was connected to a first member 208 by means of a piece 212 connected to the first member 208. The piece 212 included a recess 216 which received an end 220 of the second member 204, and a screw 224 which was secured in a threaded bore 228 in the piece 212. The screw 224 projected into the recess 216 and was received in an opening 232 in the end 220 of the second member 204. More particularly, the first member 208 was received in a bore 236 in spaced-apart housings 240 and 244. The piece 212 connected to the first member 208 was located outside of the spaced-apart housings 240 and 244, and included a portion 248 extending at a right angle to the first member 208. The portion 248 included the recess 216 which received the end 220 of the second member 204. To connect or disconnect the second member 204 from the first member 208, access to the screw 224 was required to turn the screw 224 in the threaded bore 228 to thereby or withdraw the screw 224 from the opening 232 in the end 220 of the second member 204. The recess 216 was larger than the end 220 of the second member 204 so that the end 220 of the second member 204 could pivot on the screw 224 in the recess 216.

The first member 208 was secured in the housings 240 and 244 by the first piece 212 and a cotter pin, washer, and bow washer assembly 260 located on the first member 208 outside of the housings 240 and 244 opposite the first piece 212.

Attention is also directed to Conroy U.S. Pat. No. 2,887,083, issued May 19, 1959.

SUMMARY OF THE INVENTION

This invention provides a connecting assembly comprising support means including spaced-apart sides, and a bore extending between the sides, a first member slidable in the bore and including a first portion located on one of the sides of the support means, and a second member including an opening therein. The connecting assembly also includes means adjacent to one side of the support means for connecting the second member to the first portion of the first member and comprising a first piece fixedly connected to the first portion, and a second piece located between the first piece and the one side of the support means. The second piece also includes a bore which receives the first member for movement thereof relative to the second piece between a connect position with the first piece adjacent the second piece and a disconnect position with the first piece spaced from the second piece. The connecting means also includes pin means which projects from one of the first piece and the second piece, and which extends into the opening in the second member when the first member is in the connect position, so that the second member is secured on the pin means between the first piece and the second piece. The pin means is withdrawn from the opening when the first member is in the disconnect position. The connecting means also includes means for releasably securing the first member in the connect position.

In one embodiment, the connecting means connects the second piece at a right angle to the first piece, and the second piece includes an opening which receives the pin means. The means for releasably securing the first member comprises means selectively engageable between the support means and the first member, and operable, when engaged, to hold the first member in the connect position, and operable, when disengaged, to permit movement of the first member to the disconnect position.

In another embodiment of the invention, the means for releasably securing the first member comprises means operable between the support means and the first member for biasing the first member into the connect position.

One of the principal features of the invention is the provision of a connecting assembly permitting quick connection and disconnection of a second member from a first member.

Another of the principal features of the invention is the provision of such a connecting assembly which permits connecting and disconnecting by access to a point spaced from the point of connection of the second member to the first member.

Another of the principal features of the invention is the provision of such a connecting assembly which permits pivotal movement of a portion of the first member to cause generally linear movement of the second member.

Various other of the features of the invention will become apparent upon reviewing the following drawings, description, and appended claims.

BRIEF DESCRIPTION OF THE DRAWINGS

FIG. 1 is a side view, partially broken away and in section, of a connecting assembly which includes a second member connected to a first member and which embodies various of the features of the invention.

FIG. 2 is a similar view of the connecting assembly shown in FIG. 1, but with the second member disconnected from the first member.

FIG. 3 is an end view of the connecting assembly shown in FIG. 1.

FIG. 4 is a side view, partially broken away and in section, of another embodiment of a connecting assembly which embodies various of the features of the invention.

FIG. 5 is a side view, partially in section, of a prior art connecting assembly.

Before explaining the invention in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood that the phraseology and terminology employed herein is for the purposes of description and should not be regarded as limiting.

DESCRIPTION OF PREFERRED EMBODIMENTS

Illustrated in FIGS. 1 through 3 is a connecting assembly 10. The connecting assembly 10 can be used for many purposes, and is especially suited for connecting a horizontal clutch operating member, such as operating member 56, to a vertical clutch lever, such as second member 34, which members 34 and 56 form part of a clutch linkage (not shown) of an outboard motor.

More particularly, the connecting assembly 10 comprises support means 14 including spaced-apart sides 18 and 22, and a bore 26 extending between the sides 18 and 22. The connecting assembly 10 also includes a first member 30 slidable in the bore 26 between a connect position, as shown in FIG. 1, and a disconnect position, as shown in FIG. 2, and the second member 34 which includes an opening 38 in an end thereof. The connecting assembly 10 also includes means 42 adjacent the side 18 of the support means 14 for connecting the second member 34 at a right angle to the first member 30, and means 46 for releasably securing the first member 30 in the connect position.

More particularly, the support means 14 comprises spaced-apart first and second housings 50 and 54, respectively, and the side 18 is outside of the housings 50 and 54 and on the first housing 50, and the side 22 is outside of the housings 50 and 54 and on the second housing 54. The bore 26 extends through the first housing 50 and the second housing 54. In other embodiments, a single housing, or more than two housings, can be provided.

Although various materials can be used, the first member 30 is fabricated from steel. Although various shapes can be used, a portion of the first member 30 is bent at a right angle so one end 55 can be connected to and movable by the operating member 56. Movement of the end 55 of the first member 30 rotates the first member 30 in the bore 26.

More particularly, the first member 30 includes a first portion 58 partially located on the side 18 of the support means 14, and a second portion 62 located on the side 22 of the support means 14.

The first member 30 also includes means for facilitating connection of the first member 30 to the connecting means 42. More particularly, the first member 30 is generally cylindrical, except that the first portion 58 has a half circle transverse cross section (as best shown in FIG. 3).

As illustrated in FIGS. 1 and 2, the connecting means 42 for connecting the second member 34 to the first member 30 comprises a first piece 66 including a portion 70 extending at a right angle to the first portion 58 of the first member 30, a second piece 74 located between the first piece 66 and the one side 18 of the support means 14, and pin means 78 projecting from one of the first piece 66 and the second piece 74.

More particularly, as illustrated in FIG. 3, the connecting means first piece 66 is fixedly connected to the end of the first portion 58 of the first member 30. While various constructions can be used, in this embodiment, the first piece 66 is fabricated from aluminum and includes a half circle opening 82 which receives the half circle first portion 58 of the first member 30. The first piece 66 also includes a slot 86 which extends radially from the opening 82 receiving the first portion 58, and means 90 for closing the slot 86 to secure the first piece 66 on the first portion 58 of the first member 30. In the preferred embodiment, the closing means 90 comprises a screw 94 received in a threaded bore 98 transverse to the slot 86.

As illustrated in FIGS. 1 and 2, the second piece 74 is connected to the side 18 of the support means 14 by a bushing portion 106 which includes a bore 102 slidably receiving the first member 30. The bushing portion 106 is received inside the bore 26 and is secured in the first housing 50 by an outer lip portion 107 and a plate 109 located between the side 18 of the housing 50 and the first piece 66. More particularly, the bore 102 extends through the plate 109, and the portion of the bore 102 in the plate 109 is a half circle in cross section, while the portion of the bore 102 in the bushing portion 106 is circular in cross section in order to permit sliding movement of the first member 30 in the bushing portion 106.

The second piece plate 109 also includes a portion 110 extending at a right angle to the first portion 58 of the first member 30 in coextensive relationship with the first piece portion 70.

While various materials can be used, in the embodiment illustrated, the second piece 74 is fabricated from a plastic material, such as acetal homo polymer.

While other constructions can be employed in other embodiments, the pin means 78 projects from the first piece portion 70 and is in the form of a pin press fitted into an opening in the first piece portion 70. In other embodiments (not shown), the pin 78 can project from the second piece portion 110. The pin 78 extends perpendicularly from the first piece portion 70.

As illustrated in FIG. 1, the pin 78 extends into the opening 38 of the second member 34 when the first member 30 is in the connect position. As a result, the second member 34 is secured on the pin 78 between the first piece portion 70 and the second piece portion 110. The second piece portion 110 also includes an opening 112 which receives the tip of the pin 78 when the first member 30 is in the connect position.

As is now apparent, the first member 30 is axially movable relative to the second piece 74 between the connect position with the first piece 66 adjacent the second piece 74, as illustrated in FIG. 1, and the disconnect position with the first piece 66 spaced apart from the second piece 74, as illustrated in FIG. 2. When the first member 30 is in the disconnect position, as shown in FIG. 2, the pin 78 can be withdrawn from the opening 38 in the second member 34 and the second member 34 is thus disconnected from the first member 30.

The first piece portion 70 also includes a recess 114 which is larger than the end 38 of the second member 30 and which receives the end 38 of the second member 30. As a result, when the first member 30 is in the connect position, the first piece portion 70 and second piece portion 110 are spaced from the opposite sides of the second member 34. The second member 34 is thus free to pivot about the pin 78 because of this clearance provided between the end 38 of the second member 34 and the first and second piece portions 70 and 110, respectively.

In the embodiment illustrated in FIGS. 1 through 3, the means 46 releasably securing the first member 30 in the connect position comprises means 118 selectively engageable between the support means 14 and the first member 30. More particularly, the selectively engageable means 118 comprises a projection 122 on the second portion 62 of the first member 30 adjacent the side 22 of the support means 14, which projection 122 either engages the support means 14 or does not engage the support means 14. In other embodiments, means (not shown) extending through the support means 14 into or against the first member 30 can be used.

More particularly, the projection 122 is in the form of a spring hair pin received in a bore 124 through the second portion 62 of the first member 30. The spring hair pin 122 is easily and quickly removable from the bore 124.

As illustrated in FIGS. 1 and 2, means is also provided for biasing the first piece 66 toward the second piece 74, and for assisting in securing the spring hair pin 122 in the bore 124. The biasing means comprises a washer 126 adjacent the spring pin 122, and a bow washer 130. The washer 126 and bow washer 130 are concentric with the second portion 62 of the first member 30, and are located between the spring hair pin 122 and the side 22 of the support means 14. A plastic bushing 134 is also provided in the bore 26 in the second housing 54.

The spring hair pin 122 thus operates, when engaged or secured in the bore 124, to hold the first member 30 in the connect position by preventing axial movement of the second portion 62 in the support means 14, and operates, when disengaged or removed from the bore 124, to permit movement of the first member 30 to the disconnect position by permitting axial movement of the second portion 62 in the support means 14.

When the second member 34 is thus connected to the first member 30, pivotal movement of the first member 30 occassioned by generally linear movement of the operating member 56 causes generally linear movement of the second member 34. This general direction of movement of the second member 34 is spaced from and is generally perpendicular to the general direction of movement of the operating member 56.

In an alternate embodiment 136, as illustrated in FIG. 4, the means 46 for releasably securing the first member 30 in the connect position comprises biasing means 138 between an abutment or projection 142 on the second portion 62 of the first member 30, and the side 22 of the support means 14. The biasing means is in the form of a spring 138 which is concentric with the second portion 62 of the first member 30 and which biases the first member 30 into the connect position. The first member 30 is thus secured in the connect position until the spring 138 is compressed by an external force applied to the second portion 62 of the first member 30.

In this embodiment 136, the abutment 142 on the second portion 62 comprises a cotter pin 146 received in a bore 150 in the second portion 62, and a washer 154 between the spring 138 and cotter pin 146 and concentric on the second portion 62 of the first member 30.

Various of the features of the invention are set forth in the following claims.

I claim:

1. A connecting assembly comprising a stationary support means including spaced-apart sides, and a bore extending between said sides, a first member slidable in said bore, and including a first portion located on one of said sides of said support means, a second member including an opening therein, means adjacent said one side of said support means for connecting said second member to said first portion of said first member and comprising a first piece fixedly connected to said first portion, a second piece located between said first piece and said one side of said support means and including a bore receiving said first member for movement thereof relative to said second piece between a connect position with said first piece adjacent said second piece, and a disconnect position with said first piece spaced from said second piece, and pin means which projects from one of said first piece and said second piece and which extends into said opening in said second member when said first member is in said connect position so that said second member is secured on said pin means between said first piece and said second piece and which is withdrawn from said opening when said first member is in said disconnect position, and means for releasably securing said first member in said connect position.

2. A connecting assembly comprising a stationary support means including spaced-apart sides, and a bore extending between said sides, a first member slidable in said bore, and including a portion located on one of said sides of said support means, a second member including an opening therein, and means adjacent said one side of said support means for connecting said second member at a right angle to said first member portion and comprising a first piece fixedly connected to said first member portion and including a portion extending at a right angle to said first member portion, a second piece located between said first piece and said one side of said support means and including a bore receiving said first member for movement thereof relative to said second piece between a connect position with said first piece adjacent said second piece and a disconnect position with said first piece spaced from said second piece, and a portion extending at a right angle to said first member portion coextensive with said first piece portion, pin means which projects from one of said first piece portion and said second piece portion and which extends into said opening in said second member when said first member is in said connect position so that said second member is secured on said pin means between said first piece portion and said second piece portion and which is withdrawn from said opening when said first member is in said disconnect position, and means for releasably securing said first member in said connect position.

3. A connecting assembly in accordance with claim 2 wherein the other of said first piece portion and said second piece portion includes an opening which receives said pin means.

4. A connecting assembly in accordance with claim 3 wherein said first piece portion includes a recess which is larger than said second member and which receives said second member so that said second member is pivotal about said pin means.

5. A connecting assembly in accordance with claim 2 wherein said support means comprises two spaced-apart housings, wherein said one side is outside of and on one of said housings, wherein said other side is outside of and on said other of said housings, and wherein said bore extends through said first housing and said second housing.

6. A connecting assembly in accordance with claim 2 wherein said second piece is connected to said one side of said support means.

7. A connecting assembly in accordance with claim 2 wherein said means for releasably securing said first member comprises means selectively engagable between said support means and said first member and operable when engaged to hold said first member in said connect position and operable when disengaged to permit movement of said first member to said disconnect position.

8. A connecting assembly in accordance with claim 7 wherein said first member also includes a second portion located on the other of said sides of said support means when said first member is in said connect position, and wherein said means selectively engagable between said support means and said first member is operable when engaged to prevent passage of said second portion through said support means, and operable when disengaged to permit passage of said second portion through said support means.

9. A connecting assembly in accordance with claim 8 wherein said selectively engagable means comprises a projection which is on said second portion, and which is adjacent said other side of said support means, and which alternately is engageable with said support means and not engageable with said support means.

10. A connecting assembly in accordance with claim 9 wherein said projection comprises a spring hair pin received in a bore through said second portion.

11. A connecting assembly in accordance with claim 2 wherein said means for releasably securing said first member comprises means operable between said support means and said first member for biasing said first member into said connect position.

12. A connecting assembly in accordance with claim 11 wherein said first member also includes a second portion which is located on the other of said sides of said support means when said first member is in said connect position, and which includes an abutment, and wherein said biasing means comprises a spring concentric with said second portion and between said abutment and said other side of said support means.

13. A connecting assembly comprising stationary support means including a side and a bore opening at said side, a first member slidable in said bore and located, in part, adjacent said support means side, a second member including an opening therein, and means adjacent said support means side for connecting said second member to said first member and comprising a first piece fixedly connected to said first member, a second piece located between said first piece and said support means side and including a bore receiving said first member for movement thereof relative to said second piece between a connect position with said first piece adjacent said second piece, and a disconnect position with said first piece spaced from said second piece, and pin means which projects from one of said first piece and said second piece and which extends into said opening in said second member when said first member is in said connect position so that said second member is secured on said pin means between said first piece and said second piece and which is withdrawable from said opening when said first member is in said disconnect position.

* * * * *